April 14, 1936.                W. BEAUCLERK                 2,037,362
                         SLICED LOAF BAGGING DEVICE
                    Filed March 16, 1934        3 Sheets-Sheet 1
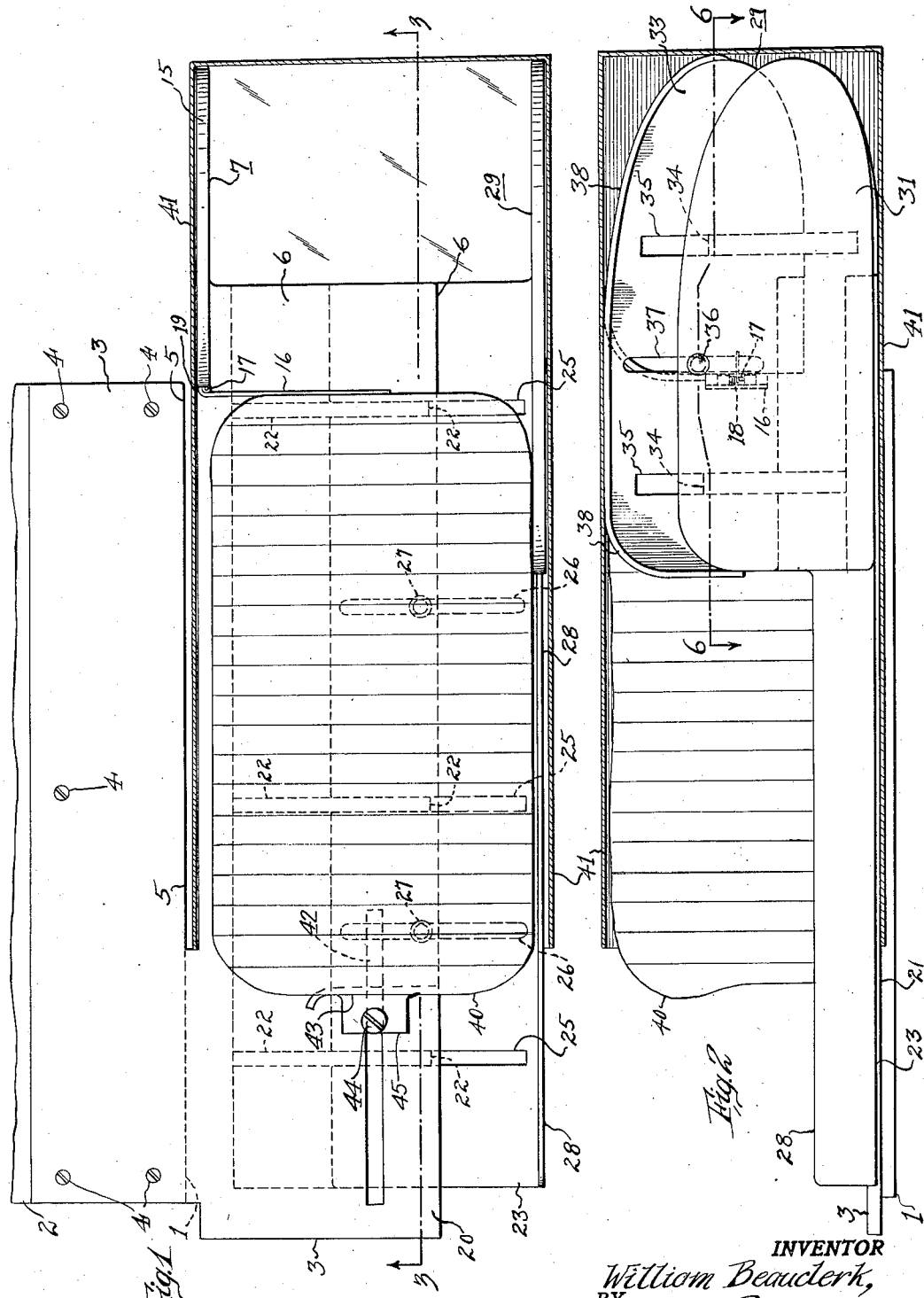
INVENTOR
William Beauclerk,
BY
George D. Richards
ATTORNEY April 14, 1936.  W. BEAUCLERK  2,037,362
SLICED LOAF BAGGING DEVICE
Filed March 16, 1934  3 Sheets-Sheet 2
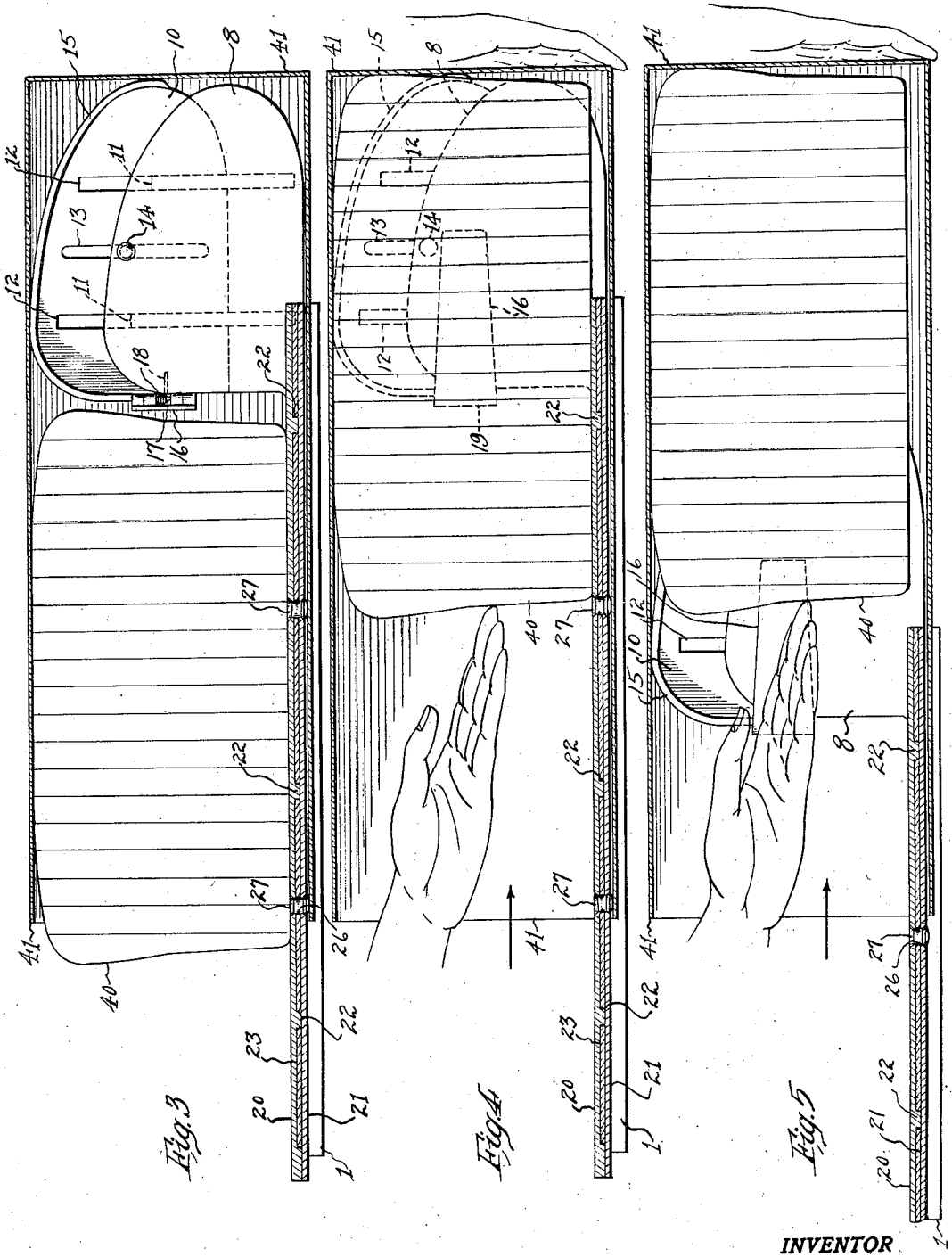
INVENTOR
William Beauclerk,
BY
George D. Richards
ATTORNEY

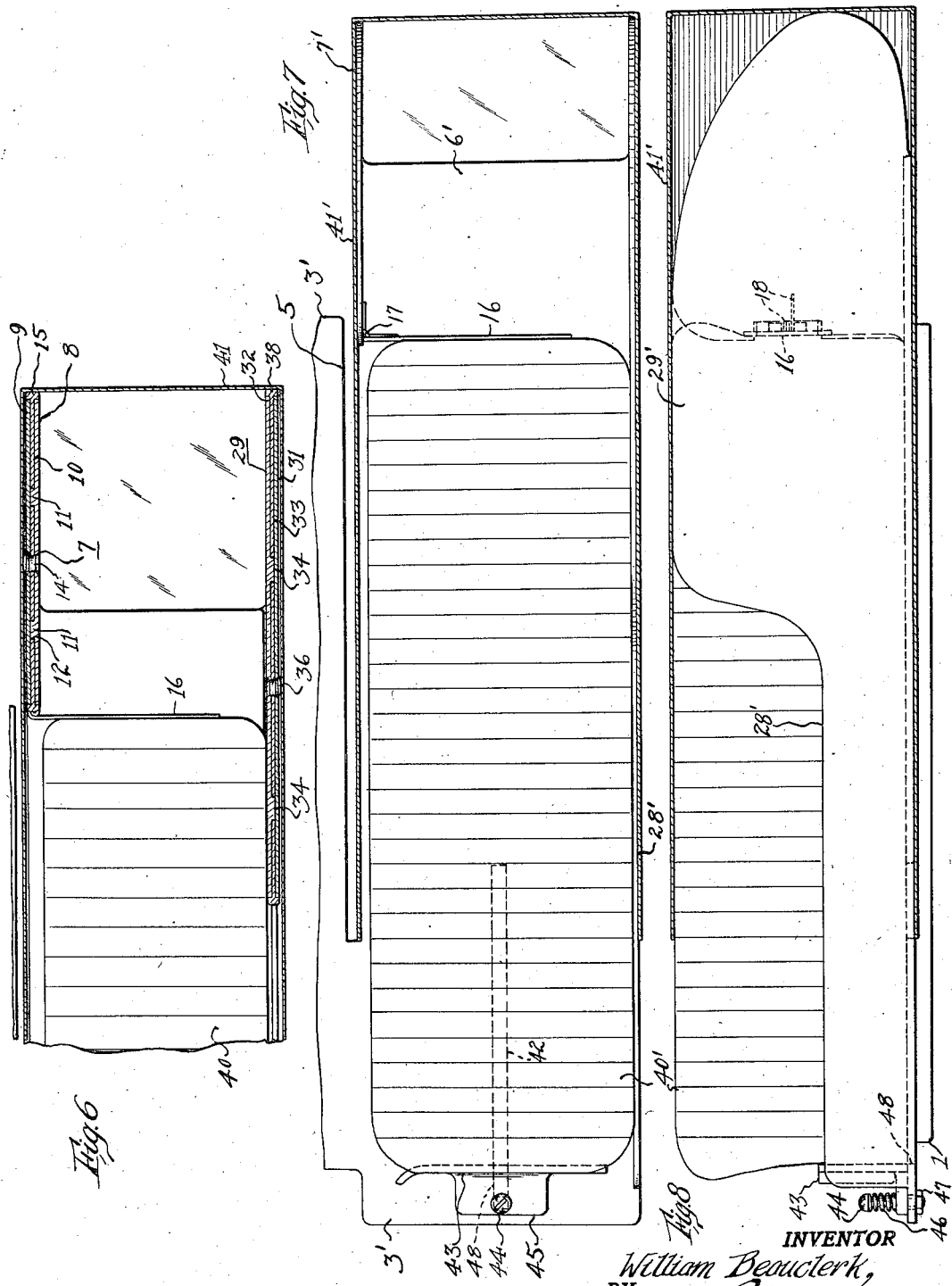

Patented Apr. 14, 1936

2,037,362

UNITED STATES PATENT OFFICE 2,037,362

SLICED LOAF BAGGING DEVICE

William Beauclerk, Irvington, N. J., assignor to Pure Made Products Co., a corporation of New Jersey Application March 16, 1934, Serial No. 715,873

7 Claims. (Cl. 226—18)

This invention relates, generally, to the bagging or wrapping of loaves of bread, and the invention has reference, more particularly, to a novel improved bagging device for use in inserting presliced bread loaves into containing bags.

It has recently become popular to deliver bread to consumers in a presliced condition, the bread being bagged or wrapped, preparatory to delivery, after the slicing operation. There are a number of slicing machines on the market which slice the bread loaves and deliver the same successively to a platform at the front of the machine. Heretofore, the sliced loaves have generally been removed from this platform and then hand wrapped, i. e. inserted into bags by hand. In my co-pending application Serial No. 696,552 I have disclosed a novel sliced loaf bagging device having a carriage adapted for receiving presliced loaves, the said carriage being movable to insert the loaves into bags or other containers.

The principal object of the present invention is to provide a novel sliced loaf bagging device so constructed and arranged so as to enable the easy and quick insertion of presliced bread loaves into a bag or other container, the said device being without a movable carriage.

Another object of the present invention lies in the provision of a novel sliced loaf bagging device having a base or platform for receiving presliced loaves, the said base or platform being constructed so as to enable the ready telescoping of a bag or other container over the same and over a bread loaf resting thereon, whereupon the bagged loaf is readily removed by sliding the same off the base.

A third object of the present invention is to provide a novel sliced loaf bagging device of the above character that is so constructed and arranged as to be readily variable as to dimensions for efficiently handling bread loaves of various sizes and shapes.

Other objects of this invention, not at this time more particularly enumerated, will be clearly understood from the following detailed description of the same.

The invention is clearly illustrated in the accompanying drawings, in which:

Fig. 1 is a plan view of the novel sliced loaf bagging device of this invention, the said device being shown attached to the delivery platform of a slicing machine and illustrated as having a loaf of presliced bread thereon, a bag being shown in section and partly telescoped over the bread loaf.

Fig. 2 is a view in front elevation of the structure shown in Fig. 1, the bag being shown in section.

Fig. 3 is a part sectional view taken along line 3—3 of Fig. 1 looking in the direction of the arrows.

Fig. 4 is a view similar to Fig. 3, but shows the bread loaf fully inserted into the bag and illustrates the manner of accomplishing such insertion.

Fig. 5 is a part sectional view illustrating the manner of removing the bagged loaf from the device.

Fig. 6 is a fragmentary, part sectional view taken along line 6—6 of Fig. 2.

Fig. 7 is a view similar to Fig. 1, but of a slightly modified construction, and Fig. 8 is a view in front elevation of the structure shown in Fig. 7.

Similar characters of reference are employed in said views, to indicate corresponding parts.

Referring now to Figs. 1 to 6 of the said drawings, the reference numeral 1 designates the forward portion of a bread slicing machine having a flat top plate or platform 2 serving to receive loaves of bread sliced by the machine. The novel loaf bagging device of this invention is illustrated as comprising a base or platform 3 that has its rear portion attached, as by screws 4, to the forward portion 1 of the bread slicing machine, the upper flat surface of base 3 being preferably flush with the upper surface of top plate 2. It is to be understood, that the loaf bagging device of this invention may be removed from and used independently of the slicing machine and as an aid in packing the sliced loaves taken from such machine.

The base 3 is provided, immediately in front of the slicing machine 1, with a longitudinal slot or aperture 5 extending from one end of the base for the greater part of the length thereof. The forward part of base 3, i. e. the part in front of slot 5 is illustrated as provided with an end extension 6 projecting beyond the end of the rear portion of the base 3. An upstanding vertically extensible, bag guiding and supporting arm 7 is provided at the rear edge of the extension 6.

As especially shown in Figs. 3 and 6, the arm 7 comprises front and rear plates 8 and 9 that are attached at their bottom edges to the base and extension 6. An intermediate extension plate 10 is positioned between front and rear plates 8 and 9 and is vertically adjustable with respect to plates 8 and 9. Vertical guide members 11 extend between plates 8 and 9 and project through vertical slots 12 that extend upwardly from the lower edge of the intermediate plate 10, whereby the guide members 11 serve to guide the intermediate plate 10 in its vertical movement. Plate 10 is provided with a vertical slot 13, the ends of which terminate near the upper and lower edges of plate 10. A rivet 14 projects through slot 13 and has its ends attached to plates 8 and 9. Rivet 14 cooperates with slot 13 in limiting the vertical adjusting movement of intermediate extension plate 10 so that this plate cannot become detached from plates 8 and 9.

Plates 8, 9 and 10, forming the bag guiding and supporting arm 7, are similar in shape and the major portion of each of these plates projects beyond the end of extension 6, the outer end portion of each plate being rounded and having somewhat converging upper and lower edges to facilitate the telescoping of bags over the arm 7. The upper edge portion of intermediate plate 10 is shown provided with a bead or flange 15 that overlies the upper edges of front and rear plates 8 and 9. With the intermediate plate 10 pushed down as far as it will go, the under surface of bead 15 abuts the upper edges of plates 8 and 9, thereby giving the bag guiding and supporting arm 7 an unitary appearance, the said arm being now positioned for receiving relatively small bags used in bagging small loaves of bread. When larger loaves are bagged, the intermediate plate 10 is raised so that the top of its bead 15 is substantially level with the top of the bread loaf placed on base 3. The intermediate plate 10 has a snug fit between plates 8 and 9, so that the plate 10 will remain in any vertically adjusted position in which the same is placed owing to the frictional grip of plates 8 and 9 on this intermediate plate 10.

The inner end of the intermediate plate 10 has a gate 16 hingedly connected thereto as by a hinge pintle 17. A coiled torsion spring 18 is mounted on pintle 17 and urges gate 16 in a clockwise direction as viewed in Fig. 1. With the gate 16 extending at right angles to the plate 10, as shown in Fig. 1, the rounded end 19 of gate 16 abuts the hinged knuckles affixed to the intermediate plate 10, so that spring 18 cannot turn the gate 16 past the position shown in Fig. 1, i. e. spring 18 normally serves to cause gate 16 to extend directly forwardly.

The base 3, as especially shown in Fig. 3, is illustrated as made up of spaced upper and lower plates 20 and 21, the said plates being spaced apart by guide members 22 extending transversely of the length of base 3. An intermediate base extension plate 23 is positioned between upper and lower plates 20 and 21 and is adjustably movable forwardly and rearwardly with respect to plates 20 and 21. Guide members 22, extending between plates 20 and 21, project through slots 25 (see Fig. 1) that extend vertically through the intermediate plate 23. Guide members 22 by cooperating with slots 25 serve to guide the intermediate plate 23 when the same is adjusted forwardly or rearwardly with respect to plates 20 and 21.

Plate 23 is provided with slots 26, the respective ends of which slots terminate near the forward and rear edges of plate 23. Rivets 27 project through slots 26 and have their ends attached to plates 20 and 21. Rivets 27 cooperate with slots 26 in limiting the forward adjusting movement of intermediate extension plate 23 so that this plate cannot become detached from plates 20 and 21. By adjusting base intermediate plate 23 forwardly or rearwardly, i. e. by pushing or pulling upon this plate, the effective width of the base 3 is adjusted to compensate for various widths of bread loaves handled by the device. The frictional grip of plates 20 and 21 upon the intermediate plate 23 serves to retain plate 23 in any adjusted position.

The forward edge portion of intermediate plate 23 is provided with an upwardly directed flange 28 which serves to limit or stop the forward movement of bread loaves over the base 3. The end portion of intermediate plate 23 that is opposite the arm 7, is provided with an upstanding bag guiding and supporting arm 29 that is similar in construction to the arm 7. Arm 29 is ilustrated as being longer than arm 7, although the extent of projection of the arm 29 beyond the base end portion 6 is the same as the extent of projection of the arm 7 beyond this base end portion. The bag guiding and supporting arm 29 has front and rear plates 31 and 32 that are affixed at their lower edges to the forward edge portion of base extension plate 23. An intermediate plate 33 is snugly received between front and rear plates 31 and 32. Vertical guide members 34 extend between plates 31 and 32 and through slots 35 in the intermediate plate 33. A rivet 36, having its ends fixed in plates 31 and 32, projects through a vertical slot 37 in plate 33 to thereby prevent the complete removal of this intermediate plate from between plates 31 and 32. Intermediate plate 33 is provided with a bead 38 along its upper edge which bead is similar to bead 15.

In use, the base extension plate 23 is adjustably moved forwardly or rearwardly, as the case may be, so that the distance between the bag guiding and supporting arms 7 and 29 is sufficient to receive therebetween a bread loaf of the width to be handled by the machine at the particular time. The intermediate plates 10 and 33 of the supporting arms are then adjusted vertically so that the tops of their beads 15 and 38 are substantially level with the top of the bread loaf.

The device is now ready for use, and a loaf of presliced bread 40, delivered onto the slicing machine platform 2, is moved forwardly by the operator and over base 3 until the same is stopped by flange 28 and arm 29, the presliced loaf being positioned on base 1 so that one end of the loaf abuts the gate 16 as shown in Fig. 1. The gate 16 serves to prevent the end slice of bread abutting the same from falling down upon base 3, i. e. gate 16 serves to retain one end of the loaf intact, while the operator's left hand will normally engage the other end of the loaf thereby retaining that end of the loaf intact.

The operator then preferably uses his right hand to grasp a bag or container 41 and pass the open mouth of the same over the bag guiding and supporting arms 7 and 29. These arms 7 and 29, owing to their shape, serve to readily open the bag fully and further serve to guide the bag so that its open mouth passes easily over the stationary loaf 40, the base slot 5 making it possible to pass the bag well over the loaf 40 while the lower portion of the bag passes under base 3. The relative positions of the bag and loaf at this time are shown in Figs. 1 to 3.

The operator now places his right hand upon the outer closed end of the bag and presses with the fingers of his left hand upon the exposed end of the bread loaf, thereby pushing or sliding the loaf within the bag from its position shown in Fig. 3 to the fully inserted position in Fig. 4. During this movement of the loaf 40, the gate 16 yields to the pressure of the loaf, while tensioning spring 18 somewhat, and turns in a counter-clockwise direction, as viewed in Fig. 1, thereby enabling the ready passage of the loaf. The operator then continues to press with the fingers of his left hand upon the end of the loaf while allowing his right hand to give way so that the loaf 40 together with the bag 41 are moved bodily off of the base 3 as especially shown in Fig. 5. The open end of the bag is now closed and the bagging operation is complete, the device being ready to receive another loaf of bread so that the bagging operation may be repeated.

Owing to the use of the base extension plate 23, the width of the base 3 is readily varied to suit the widths of any particular size of bread being handled by the machine at any time. Owing to the adjustability of the intermediate plates 10 and 33 of the bag guiding and supporting arms, the device is adapted to conveniently handle bread loaves of various heights, the said bag guiding and supporting arms serving to open the bags the desired extent for receiving the loaves of bread handled. It will be noted that the bag is inserted over the loaf of bread while the bread is supported upon the base 3, thereby enabling the easy and quick telescoping of the bag over the loaf.

Where it is intended that the sliced loaf bagging device of this invention is to be used solely for handling a certain size of bread loaf, it is unnecessary for the base 3 to be extensible and it is also unnecessary for the bag guiding and supporting arms to be adjustable, as to height. The device as thus adapted for a fixed size of bread loaf is shown in Figs. 7 and 8. In these figures, the base 3' is provided with the slot 5 as before for accommodating the bag. The end portion or extension 6' of the base 3' is provided with a fixed and non-adjustable bag guiding and supporting arm 7' that has its lower edge secured to the upper surface of the end portion 6'. At the front end of the base 3' there is provided a flange 28' similar to the flange 28 described in connection with the preceding figures, and the flange 28' merges into a fixed upstanding bag guiding and supporting arm 29'. This device is also provided with the gate 16 which is hingedly connected by the hinge pintle 17 to the bag guiding and supporting arm 7'. The spring 18 serves to properly position the gate 16 so that the same will support the end slice of the bread loaf when the loaf is in the position shown in Fig. 7.

The base 3' is illustrated as provided with a longitudinal slot or aperture 42 adjacent the end thereof opposite gate 16. An upstanding end supporting plate 43 is provided with a depending rib or tongue 48 that is movable within the slot 42. Plate 43 is provided with a hold down bolt 44 that projects downwardly through an aperture provided in the base 45 of this supporting plate 43 and through the slot 42. A coil compression spring 46 surrounds the upper part of bolt 44 and urges the nut 47 on the lower end of this bolt against the undersurface of base 3', thereby resiliently holding the end supporting plate 43 in any position in which the same may be placed along the length of slot 41. The form of the invention shown in Figs. 1 to 6 may be provided in the plate 43, if desired, as shown in Fig. 1.

In use, the end supporting plate 43 is adjusted toward or away from the hinged gate 16 so that the distance between supporting plate 43 and gate 16 is substantially equal to the length of the bread loaf handled by the device. Thus, when the bread loaf is slid onto the forward portion of base 3', the ends of the same are confined between gate 16 and upstanding end supporting plate 43, so that the end slices of the loaf cannot fall over and upon the base 3' while the bag 41' is being passed over the bread loaf 40'. The method of use of this form of the device is exactly the same as that described in connection with the previous form.

It will be obvious that the upstanding end supporting plate 43 may be used in connection with the structures shown in Figs. 1 to 6, if desired. In such case the bolt 44 as well as the slot 42 need only extend through the upper plate 20 of the base and in this case the slot 42 will be preferably chamfered at its edges so that a beveled head on the lower end of bolt 44 can move therein.

As many changes could be made in the above construction and many apparently widely different embodiments of this invention could be made without departing from the scope thereof, as defined by the following claims, it is intended that all matter contained in the above description or shown in the accompanying drawings shall be interpreted as illustrative and not in a limiting sense.

I claim:

1. A sliced loaf bagging device comprising, a supporting base for receiving a bread loaf, a yieldable member supported in fixed position above said base for engaging an end of the bread loaf to retain the end slices in assembled relation with the main body of the bread loaf, and arms mounted in connection with said base, said arms being adjustable as to height for effecting the full opening of the mouth of a bag moved thereover and for guiding and supporting the bag so that the same passes over the bread loaf, said yieldable member giving away upon the application of finger pressure to the outer end of the bread loaf, thereby enabling the loaf to be fully inserted into the bag.

2. A sliced loaf bagging device comprising, a base having a longitudinal slot thereon, an upwardly directed flange on said base, said flange extending parallel to said slot and being spaced sufficiently from said slot to receive a bread loaf therebetween, the bread loaf being slid across said slot and into stopped engagement with said flange, a bag guiding and supporting arm mounted on said base adjacent said slot, a second bag guiding and supporting arm mounted on said base adjacent said flange, said bag guiding and supporting arms having converging outer end portions for effecting the opening of a bag telescoped thereover, whereby the upper part of the bag is caused to pass over a bread loaf resting on said base, while the lower part of the bag passes under said base, said slot enabling the telescoping of the bag well over the bread loaf.

3. A sliced loaf bagging device comprising a flat supporting base for receiving a bread loaf, said base being unobstructed for the major part of its length at one side to enable bread loaves to be slid transversely thereonto from such side, and having an adjustable extension plate provided with a stop flange at its outer side for varying the effective width of said base to accommodate bread loaves of various widths, a bag guiding and supporting arm mounted on said base, a second bag guiding and supporting arm mounted on said extension plate in alignment with said stop flange so as to extend parallel to said first named bag guiding and supporting arm, the spacing of said arms being varied by the adjusting of said extension plate so that any desired width of bread loaf may be passed therebetween, said arms being extensible in a direction at right angles to said base whereby the height of said arms is arranged to conform substantially to the height of the bread loaf, said arms having converging outer end portions for effecting the full opening of a bag telescoped thereover, said arms serving to guide and support the bag so that the same will telescope over the bread loaf resting on said base.

4. A sliced loaf bagging device comprising, a supporting base for receiving a loaf of bread, said base having a longitudinal slot therein, a bag guiding and supporting arm extending upwardly from said base in substantial alignment with said slot, said base having an adjustable extension plate for varying the effective width of said base to accommodate bread loaves of various widths, a bag guiding and supporting arm extending upwardly from said extension plate in parallel relation to said first named bag guiding and supporting arm, the spacing of said arms being varied by the adjusting of said extension plate so that any desired width of bread loaf may be passed therebetween, said arms having adjustable plates, whereby the height of said arms may be made equal to the height of such bread loaf, said arms serving to effect the full opening of a bag passed thereover, whereby the bag is caused to readily telescope over the bread loaf resting on said base.

5. A sliced loaf bagging device comprising, a supporting base for receiving a loaf of bread, said base having a longitudinal slot therein, a bag guiding and supporting arm extending upwardly from said base in substantial alignment with said slot, said base having an adjustable extension plate for varying the effective width of said base to accommodate bread loaves of various widths, a bag guiding and supporting arm extending upwardly from said extension plate in parallel relation to said first named bag guiding and supporting arm, the spacing of said arms being varied by the adjusting of said extension plate so that any desired width of bread loaf may be passed therebetween, said arms having adjustable plates, whereby the height of said arms may be made equal to the height of said bread loaf, said arms serving to effect the full opening of a bag passed thereover, whereby the bag is caused to readily telescope over the bread loaf resting on said base, and a yieldable gate hinged upon said first named arm for engaging the end of the bread loaf in supporting relation.

6. A sliced loaf bagging device comprising, a base, a bag guiding and supporting arm mounted on said base, a second bag guiding and supporting arm mounted on said base, said second bag guiding and supporting arm extending parallel to said first named bag guiding and supporting arm and being spaced sufficiently from the latter to allow a bread loaf to be slid lengthwise therebetween, said bag guiding and supporting arms having converging outer end portions for effecting the opening of a bag telescoped thereover, whereby the upper part of the bag is caused to pass over a bread loaf resting on said base, while the lower part of the bag passes under said base, said second bag guiding and supporting arm having an inner flange extension secured to said base and aligned with said second bag guiding and supporting arm, gate means carried by one of said bag guiding and supporting arms for engaging one end of the bread loaf and a supporting member adjustable along said base for engaging the other end of the bread loaf, said gate means and said supporting member serving to retain end slices intact with the remainder of the bread loaf.

7. A sliced loaf bagging device comprising, a base having an adjustable extension member for varying the effective width of said base to accommodate bread loaves of various widths, bag guiding and supporting arms mounted on said base and the extension thereof, said bag guiding and supporting arms serving to effect the opening of a bag telescoped thereover, whereby the upper part of the bag is caused to pass over a bread loaf resting on said base, while the lower part of the bag passes under said base, gate means positioned above said base for engaging one end of a bread loaf for supporting the end slices thereof, and a supporting plate member mounted for projecting above said base for engaging the other end of the bread loaf for supporting the other end slices thereof, said gate means being yieldable upon the application of finger pressure to the bread loaf to effect the insertion of the bread loaf into a bag engaging said supporting arms.

WILLIAM BEAUCLERK.